United States Patent
Fujii et al.

(10) Patent No.: US 9,605,173 B2
(45) Date of Patent: Mar. 28, 2017

(54) INK, INKJET RECORDING METHOD, INK CARTRIDGE, RECORDED MATTER, AND INKJET RECORDING DEVICE

(71) Applicants: Ichiroh Fujii, Kanagawa (JP); Naohiro Toda, Kanagawa (JP); Tomohiro Nakagawa, Kanagawa (JP); Hidefumi Nagashima, Kanagawa (JP); Juichi Furukawa, Kanagawa (JP); Hikaru Kobayashi, Kanagawa (JP)

(72) Inventors: Ichiroh Fujii, Kanagawa (JP); Naohiro Toda, Kanagawa (JP); Tomohiro Nakagawa, Kanagawa (JP); Hidefumi Nagashima, Kanagawa (JP); Juichi Furukawa, Kanagawa (JP); Hikaru Kobayashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/731,608

(22) Filed: Jun. 5, 2015

(65) Prior Publication Data

US 2015/0368492 A1    Dec. 24, 2015

(30) Foreign Application Priority Data

Jun. 24, 2014   (JP) ................................. 2014-128802

(51) Int. Cl.
  *C09D 11/38*  (2014.01)
  *B41M 5/50*   (2006.01)
  *C08K 5/053*  (2006.01)

(52) U.S. Cl.
  CPC ............ *C09D 11/38* (2013.01); *B41M 5/50* (2013.01); *C08K 5/053* (2013.01); *Y10T 428/24901* (2015.01)

(58) Field of Classification Search
  CPC ........... C09D 11/38; C08K 5/053; B41M 5/50
  See application file for complete search history.

(56) References Cited

U.S. PATENT DOCUMENTS

| | | | |
|---|---|---|---|
| 2001/0025588 A1* | 10/2001 | Takemoto | C09D 11/38 106/31.36 |
| 2011/0318551 A1 | 12/2011 | Nakagawa | |
| 2012/0188312 A1 | 7/2012 | Nakagawa | |
| 2012/0207983 A1* | 8/2012 | Matsuyama | C09D 11/328 428/195.1 |
| 2012/0308785 A1 | 12/2012 | Nakagawa | |
| 2013/0002776 A1 | 1/2013 | Nagashima et al. | |
| 2014/0002539 A1 | 1/2014 | Goto et al. | |
| 2014/0022321 A1* | 1/2014 | Komatsu | C09D 11/30 347/100 |
| 2014/0192112 A1 | 7/2014 | Nagashima et al. | |
| 2014/0267520 A1 | 9/2014 | Toda et al. | |
| 2014/0368572 A1 | 12/2014 | Goto | |
| 2014/0377516 A1 | 12/2014 | Toda et al. | |
| 2015/0017396 A1 | 1/2015 | Nakagawa et al. | |
| 2015/0050467 A1 | 2/2015 | Nakagawa et al. | |
| 2015/0077482 A1 | 3/2015 | Toda et al. | |
| 2015/0116433 A1 | 4/2015 | Fujii et al. | |

FOREIGN PATENT DOCUMENTS

| | | |
|---|---|---|
| JP | 2004-043518 | 2/2004 |
| JP | 2005-220352 | 8/2005 |
| JP | 2011-094082 | 5/2011 |
| JP | 2012-207202 | 10/2012 |
| WO | WO 2013/115344 A1 | 8/2013 |

OTHER PUBLICATIONS

Extended European Search Report issued Sep. 16, 2015 in Patent Application No. 15173405.0.

* cited by examiner

*Primary Examiner* — Betelhem Shewareged

(74) *Attorney, Agent, or Firm* — Oblon, McClelland, Maier & Neustadt, L.L.P.

(57) ABSTRACT

An ink contains a colorant, a water soluble organic solvent, a silicone-based surfactant, a compound represented by the following chemical formula 1, and water, wherein the water soluble organic solvent having a boiling point of 250° C. or higher accounts for 38% by weight or less in a total amount of the water soluble organic solvent, Chemical formula 1

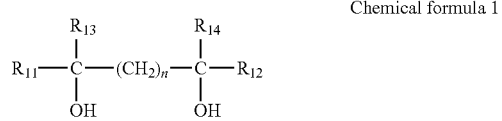

where $R_{11}$ and $R_{12}$ each, independently represent aliphatic hydrocarbon groups having 3 to 6 carbon atoms with forks and $R_{13}$ and $R_{14}$ each, independently represent alkyl groups having one to two carbon atoms, and n represents an integer of from 1 to 6.

17 Claims, 3 Drawing Sheets

INK, INKJET RECORDING METHOD, INK CARTRIDGE, RECORDED MATTER, AND INKJET RECORDING DEVICE

CROSS-REFERENCE TO RELATED APPLICATIONS

This patent application is based on and claims priority pursuant to 35 U.S.C. §119(a) to Japanese Patent Application No. 2014-128802, filed on Jun. 24, 2014, in the Japan Patent Office, the entire disclosure of which is hereby incorporated by reference herein.

BACKGROUND

Technical Field

The present invention relates to an ink, an inkjet recording method, an ink cartridge, recorded matter, and inkjet recording device.

Background Art

Inkjet printers are relatively quiet, enjoy low running costs, and are easily capable of printing color images. In inkjet image forming technologies using an inkjet printer, an inkjet ink is used in which a colorant is dissolved or finely-dispersed in an aqueous ink medium and normally a mixture of pure water and a hydrophilic organic solvent is used as the liquid medium component. As the hydrophilic organic solvent, alcohols, glycols, nitrogen-containing organic solvents having low boiling points, and sulfur-containing organic solvents such as sulfolane having low boiling points are used.

In recent years, inkjet technologies have been appealing in business field of, for example, display, posters, and signboards in addition to home use. As recording media, non-permeating substrate such as plastic film have been used and inks have been developed for such media.

For example, as such ink, solvent-based inkjet ink using an organic solvent as a vehicle or ultraviolet-curable inkjet ink using a polymerizable monomer as its main component have been widely used.

Aqueous inks for inkjet recording widely used at home are now appealing because of its less burden on environment so that development of such aqueous inks for inkjet recording that can be directly printed on non-permeating substrates is in progress.

SUMMARY

According to the present invention, provided is an improved ink which contains a colorant, a water soluble organic solvent, a silicone-based surfactant, a compound represented by the following chemical formula 1, and water, wherein the water soluble organic solvent having a boiling point of 250° C. or higher accounts for 38% by weight or less in the total amount of the water soluble organic solvent,

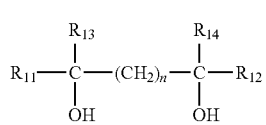

Chemical formula 1 where $R_{11}$ and $R_{12}$ each, independently represent aliphatic hydrocarbon groups having 3 to 6 carbon atoms with forks and $R_{13}$ and $R_{14}$ each, independently represent alkyl groups having one to two carbon atoms, and n represents an integer of from 1 to 6.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
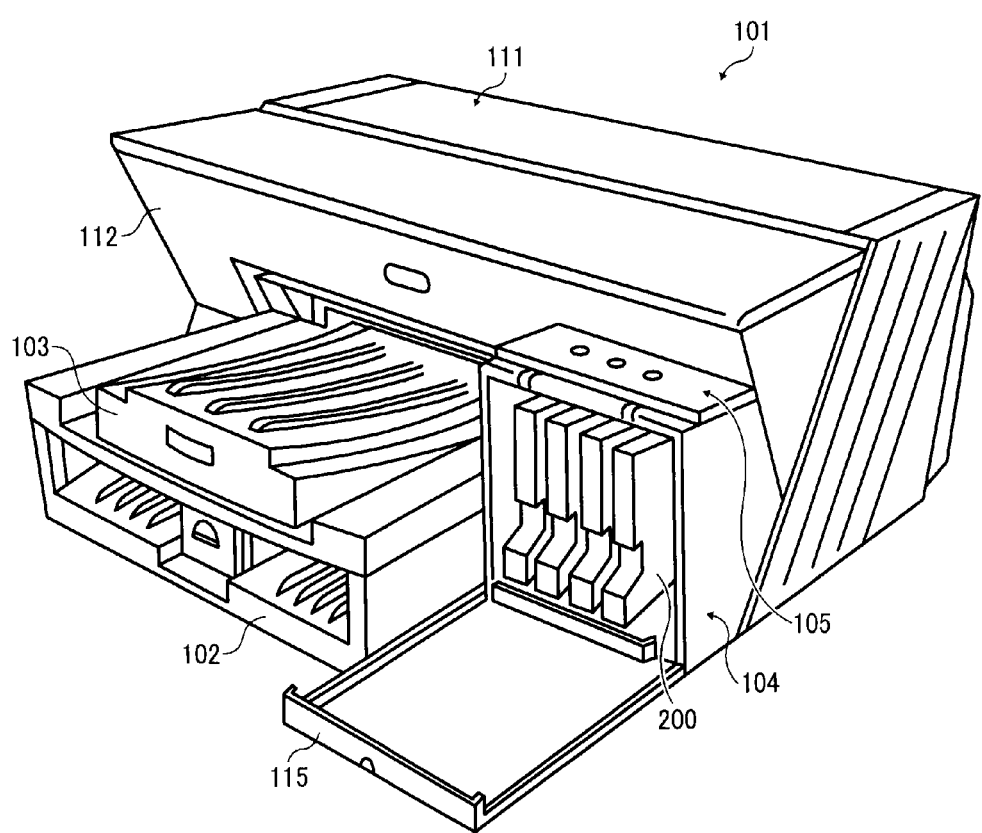
FIG. 1 is a schematic diagram illustrating an example of a serial type inkjet recording device.

According to an embodiment 1 of the present invention, provided is an improved ink which contains a colorant, a water soluble organic solvent, a silicone-based surfactant, a compound represented by the following chemical formula 1, and water, wherein the water soluble organic solvent having a boiling point of 250° C. or higher accounts for 38% by weight or less in the total amount of the water soluble organic solvent,

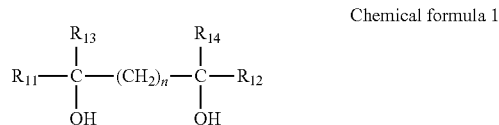

Chemical formula 1 where $R_{11}$ and $R_{12}$ each, independently represent aliphatic hydrocarbon groups having 3 to 6 carbon atoms with forks and $R_{13}$ and $R_{14}$ each, independently represent alkyl groups having one to two carbon atoms, and n represents an integer of from 1 to 6.

The ink produced images with high image density and gloss without a gap on a non-permeating substrate by ink droplets wet-spreading there even at room temperature The present disclosure is described in detail about the embodiment 1. In addition, since the following 2 to 10 are contained in the embodiments of the present disclosure, these are also described.

2. The ink described in 1 mentioned above, wherein the compound represented by Chemical formula 1 is 2,4,7,9-tetramethyldecane-4,7-diol or 2,5,8,11-tetramethyl dodecane-5,8-diol.

3. The ink described in 1 or 2 mentioned above, wherein the ratio of the silicone-based surfactant to the compound represented by Chemical formula 1 ranges from 1:1 to 9:1.

4. The ink described in any one of 1 to 3 mentioned above, wherein the water soluble organic solvent contains at least one kind of the water soluble organic solvent having a boiling point of 200° C. or lower and the water soluble organic solvent having a boiling point of 200° C. or lower accounts for 50% by weight or more of the water soluble organic solvent.

5. The ink described in 4 mentioned above, wherein the water soluble organic solvent having a boiling point of 200° C. or lower contains at least one of 1,2-propane diol and 2,3-butane diol.

6. The ink described in any one of 1 to 5 mentioned above, wherein the boiling point of the water soluble organic solvent is lower than 250° C.

7. An ink cartridge including a container to accommodate the ink described in any one of 1 to 6 mentioned above.

8. An inkjet recording method including discharging the ink described in any one of 1 to 6 mentioned above by applying energy to the ink for recording.

9. Recorded matter containing a recording medium and an image formed on the recording medium by utilizing the inkjet recording method described in 8 mentioned above.

10. An inkjet recording device including either of an ink container or an ink cartridge to contain the ink of any one of 1 to 6 mentioned above and either of an inkjet recording head or a recording unit having the inkjet recording head to discharge droplets of the ink described in any one of 1 to 6 mentioned above formed by application of energy to the ink.

Water soluble organic solvents are added to an aqueous ink for inkjet (hereinafter referred to as ink) to prevent the ink from drying at the nozzle surface or secure wettability of the ink to a recording medium. In general, water soluble organic solvents have a higher boiling point than water so that it is little or never dried. For this reason, to impart drying property to a water soluble organic solvent, a water soluble organic solvent having a relatively low boiling point is added. However, if quick drying is demanded, inks dry in a head, thereby degrading the discharging property of the ink. In addition, when an ink containing a resin is used, a layer is formed by the resin particles too soon in general. Consequently, an uneven layer is easily formed, so that the robustness of the layer and gloss thereof are degraded.

Furthermore, droplets of aqueous ink little or never wet-spread on a non-permeating substrate and also are hardened soon. Therefore, the droplets do not wet-spread on the substrate so that a printed solid image has voids so that the image density thereof is not easily increased.

To improve wet-spreading of the aqueous ink droplets, it is suitable to add a surfactant to lower surface tension. Particularly, a silicon-based surfactant is suitable for non-permeating substrates. As the addition amount of such a silicone-based surfactant increases, wettability is improved but the adherence of a formed layer is worsened.

In general, when a non-permeating substrate is heated, wettability is ameliorated although a heater or a heating energy has to be provided. As a result of investigations and discussions to improve wettability, the present inventors have found that wettability can be improved even at room temperature without heating by a combinational use of a silicone-based surfactant and the compound represented by the following chemical formula 1.

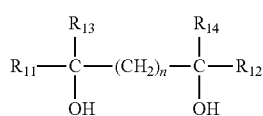

Chemical formula 1 where $R_{11}$ and $R_{12}$ each, independently represent aliphatic hydrocarbon groups having 3 to 6 carbon atoms with forks and $R_{13}$ and $R_{14}$ each, independently represent alkyl groups having one to two carbon atoms, and n represents an integer of from 1 to 6.

The compositions of the ink of the present disclosure are described next.

Colorant

The colorant for use in the present disclosure can be pigments, dyes, etc. without a limitation.

The pigment can be inorganic or organic. Titanium oxide, iron oxide, calcium oxide, barium sulfate, aluminum hydroxide, barium yellow, cadmium red, chrome yellow, and carbon black manufactured by known methods such as contact methods, furnace methods, and thermal methods can be used as inorganic pigments.

As the organic pigments, azo pigments (azo lakes, insoluble azo pigments, condensed azo pigments, chelate azo pigments, etc.), polycyclic pigments (phthalocyanine pigments, perylene pigments, perinone pigments, anthraquinone pigments, quinacridone pigments, dioxazine pigments, indigo pigments, thioindigo pigments, isoindolinone pigments, and quinofuranone pigments, etc.), dye chelates (basic dye type chelates, acid dye type chelates), nitro pigments, nitroso pigments, and aniline black can be used.

Of these pigments, pigments having good affinity with solvents are preferable.

Preferred specific examples of the pigments for black include, but are not limited to, carbon black (C.I. Pigment Black 7) such as furnace black, lamp black, acetylene black, and channel black, metals such as copper and iron (C.I. Pigment Black 11), metal compounds such as titanium oxide, and organic pigments such as aniline black (C.I. Pigment Black 1).

Specific examples of the pigments for color include, but are not limited to, C.I. Pigment Yellow 1, 3, 12, 13, 14, 17, 24, 34, 35, 37, 42 (yellow iron oxide), 53, 55, 81, 83, 95, 97, 98, 100, 101, 104, 108, 109, 110, 117, 120, 138, 150, and 153; C.I. Pigment Orange 5, 13, 16, 17, 36, 43, and 51; C.I. Pigment Red 1, 2, 3, 5, 17, 22, 23, 31, 38, 48:2, 48:2 {Permanent Red 2B(Ca)}, 48:3, 48:4, 49:1, 52:2, 53:1, 57:1 (Brilliant Carmine 6B), 60:1, 63:1, 63:2, 64:1, 81, 83, 88, 101 (rouge), 104, 105, 106, 108 (Cadmium Red), 112, 114, 122 (Quinacridone Magenta), 123, 146, 149, 166, 168, 170, 172, 177, 178, 179, 185, 190, 193, 209, and 219; C.I. Pigment Violet 1 (Rohdamine Lake), 3, 5:1, 16, 19, 23, and 38; C.I. Pigment Blue 1, 2, 15 (Phthalocyanine blue), 15:1, 15:2, 15:3 (Phthalocyanine Blue), 16, 17:1, 56, 60, and 63; C.I. Pigment Green 1, 4, 7, 8, 10, 17, 18, and 36.

In addition, self-dispersion pigments can be used in which a functional group such as sulfone group and carboxyl group is attached to the surface of a pigment (e.g., carbon) to be dispersible in water.

Also, it is possible to use a material in which a pigment is encapsulated in a microcapsule to be dispersible in water, that is, resin particulates containing pigment particles can be used. In this case, pigments mixed in an ink are not necessarily encapsulated or adsorbed in resin particulates. Such pigments can be dispersed in the ink within a scope in which the present disclosure is not impaired.

There is no specific limit to the particle diameter of a pigment. It is preferable to use pigment having a particle diameter of from 20 nm to 150 nm at the greatest frequency in maximum number conversion. When the particle diameter surpasses 150 nm, the dispersion stability of pigment in ink tends to be worsened and in addition, discharging stability tends to deteriorate, thereby degrading image quality such as image density. This is not preferable. In addition, dispersing pigments finely to the particle size smaller than 20 nm involves complicated dispersion or classification operation, which causes economy problem.

To disperse pigments using a dispersant, it can be suitably selected among known dispersants. For example, dispersion polymers or water soluble surfactant can be used.

The addition amount of the pigment in an ink is preferably from about 0.1% by weight to about 10% by weight and more preferably from about 1% by weight to about 10% by weight. When the addition amount of pigments in an ink ranges from 0.1% by weight to 10% by weight, preferably from 1% by weight to 10% by weight, reliability for fixability, discharging stability, and clogging is secured.

Water Soluble Organic Solvent

Next, the water soluble organic solvent is described. In the present disclosure, the ink contains at least the water soluble organic solvent. When the total content of the water soluble organic solvent is 100% by weight, the water soluble organic solvent having a boiling point of 250° C. or higher is 38% by weight at most, preferably, 20% by weight at most, and more preferably, 5% by weight at most.

It is preferable that at least one kind of the water soluble organic solvent having a boiling point of 200° C. or lower is used and accounts for 50% by weight or more in the total content of the water soluble organic solvent.

Specific examples of the water soluble organic solvent having a boiling point of 200° C. or lower includes, but are not limited to, ethylene glycol (boiling point: 196° C.), triethylene glycol ethylether (boiling point: 135° C.), propylene glycol (boiling point: 188° C.), 1,3-propane diol (boiling point: 187° C.), 1,2-butane diol (boiling point: 194° C.), 2,3-butanediol (boiling point: 183° C.), 2-methyl-2,4-pentane diol (boiling point: 198° C.), dipropyleneglycol monomethylether (boiling point: 190° C.), propylene glycol n-butyl ether (boiling point: 171° C.), propylene glycol t-butylether (boiling point: 153° C.), diethylene glycol methylether (boiling point: 194° C.), ethylene glycol n-propylether (boiling point: 150° C.), and ethyleneglycol n-butylether (boiling point: 171° C.).

These can be used alone or in combination.

The content of the water soluble organic solvent having a boiling point of 200° C. or lower in the ink preferably accounts for at least 50% by weight and more preferably 55% by weight to 70% by weight.

When the content of the water soluble organic solvent having a boiling point of 200° C. or lower in the ink ranges from 50% by weight to 70% by weight, more preferably from 55% by weight to 70% by weight, the drying property of the ink is good so that a suitable layer is formed without causing blocking.

As the water soluble organic solvent having a boiling point of 200° C. or lower, in terms of compatibility with resins described later and layer forming property, at least using either or both of 1,2-propane diol or 2,3-butane diol is preferable.

In addition, if the limitation on the addition amount is satisfied, water soluble organic solvents other than the water soluble organic solvent having a boiling point of 200° C. or lower can be optionally added in order to obtain an ink having desired properties, prevent drying of an ink, and improve dissolution stability of an ink. However, as described above, when the total content of the water soluble organic solvent is 100% by weight, the water soluble organic solvent having a boiling point of 250° C. or higher is 38% by weight at most, preferably, 20% by weight at most, and more preferably, 5% by weight at most in the total content of the water soluble organic solvent.

Specific examples thereof include, but are not limited to, polyols such as diethylene glycol (boiling point: 245° C.), dipropylene glycol (boiling point: 245° C.), 1,3-butanediol (boiling point: 203° C.), 1,4-butanediol (boiling point: 230° C.), 2,2-dimethyl-1,3-propane diol (boiling point: 210° C.), 2-methyl-1,3-propane diol (boiling point: 213° C.), 1,2-pentanediol (boiling point: 206° C.), 2,4-pentanediol (boiling point: 201° C.), 1,5-pentanediol (boiling point: 242° C.), 2-ethyl-1,3-hexane diol (boiling point: 242° C.), 1,2-hexanediol (boiling point: 223° C.), and 2,5-hexanediol (boiling point: 221° C.); polyolalkylethers such as dipropylene glycol n-propylether (boiling point: 213° C.), propyleneglycol phenylether (boiling point: 243° C.), triethyleneglycol methylether (boiling point: 249° C.), and ethyleneglycol phenylether (boiling point: 244° C.); and water soluble organic solvents having lactome structure such as 2-pyrroridone (boiling point: 245° C.), 1-methyl-2-pyrroridone (boiling point: 202° C.), 1-ethyl-2-pyrroridone (boiling point: 218° C.), and 1-acetyl-2-pyrroridone (boiling point: 231° C.).

However, as described above, the water soluble organic solvent such as triethyleneglycol (boiling point: 285° C.), 1,6-hexane diol (boiling point: 250° C.), tripropyleneglycol n-propylether (boiling point: 261° C.), and diethyleneglycol n-hexylether (boiling point: 259° C.) accounts for 38% by weight at most, preferably 20% by weight at most, and more preferably, 5% by weight at most in the total amount of the water soluble organic solvents.

The total content of the water soluble organic solvent in an ink is preferably from 20 percent by weight to 70 percent by weight and more preferably from 30 percent by weight to 60 percent by weight to the total amount of the ink. Discharging stability can be sufficiently secured when the total content of the water soluble organic solvent in an ink is from 20% by weight to 70% by weight, preferably from 30% by weight to 60% by weight.

Surfactant

A surfactant is added to an ink so as to secure the wettability of the ink to a recording medium.

The ink of the present disclosure contains a silicone-based surfactant and the compound represented by Chemical formula 1 so that droplets of the ink wet-spread even at room temperature, resulting in a high image density and gloss with no void appearing.

Chemical formula 1

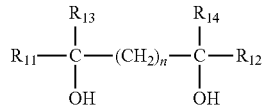

where $R_{11}$ and $R_{12}$ each, independently represent aliphatic hydrocarbon groups having 3 to 6 carbon atoms with forks and $R_{13}$ and $R_{14}$ each, independently represent alkyl groups having one to two carbon atoms, and n represents an integer of from 1 to 6.

There is no specific limit to the silicone-based surfactant. The silicone-based surfactant can be suitably selected to a particular application. Preferred are silicone-based surfactants which are not decomposed even in a high pH. Specific examples thereof include, but are not limited to, side-chain-modified polydimethylsiloxane, both end-modified polydimethylsiloxane, one end modified polydimethylsiloxane, and side-chain both end modified polydimethylsiloxane. A silicone-based surfactant that has a polyoxyethylene group and/or a polyoxyethylene polyoxypropylene group is particularly preferable because such an agent demonstrates good characteristics as an aqueous surfactant.

It is possible to use a polyether-modified silicone-based surfactant as the silicone-based surfactant. A specific example thereof is a compound in which a polyalkylene oxide structure is introduced into the side chain of the Si portion of dimethyl siloxane.

Specific examples of the compound represented by Chemical formula 1 include, but are not limited to, 2,4,7,9-tetramethyldecane-4,7-diol and 2,5,8,11-tetramethyl dodecane-5,8-diol.

The addition amount of the surfactant to an ink is preferably from 0.1% by weight to 3% by weight and more preferably from 0.5% by weight to 2% by weight in the ink.

When the addition amount of a surfactant to an ink ranged from 0.1% by weight to 3% by weight, preferably from 0.5% by weight to 2% by weight, wettability to a non-permeating substrate is good and no discharging occurs ascribable to foaming, thereby securing good discharging stability.

The ratio of the surfactant to the compound represented by Chemical formula 1 can be set in a range of from 1:2 to 12:1 and preferably from 1:1 to 9:1. When the ratio of the surfactant to the compound represented by Chemical formula 1 ranges from 1:2 to 12:1, storage stability of the ink and the wettability of the ink to a non-permeating substrate are secured.

The ink of the present disclosure optionally contains surfactants other than the silicone-based surfactant.

The surfactant can be any of an amphoteric surfactant, a nonionic surfactant, and an anionic surfactant. Considering the relation between the dispersion stability of a colorant and the image quality, nonionic surfactants are preferable, which include polyoxyethylene alkyl phenyl ether, polyoxyethylene alkyl ester, polyoxyethylene alkyl amine, polyoxyethylene alkyl amide, polyoxyethylene propylene block polymer, sorbitan aliphatic acid esters, polyoxyethylene sorbitan aliphatic acid esters, and adducts of acetylene alcohol with ethylene oxides, etc. In addition, it is possible to add a fluorine-containing surfactant and/or another silicone-based surfactant depending on formulation.

Resin Particle

Resin particles can be optionally added to the ink. The resin particles can be added in the process of, for example, manufacturing the ink, in a form of a resin emulsion in which resins are dispersed in water.

There is no specific limit to the identity of the resin emulsion. The resin particles can be selected to each of a particular application. Specific examples thereof include, but are not limited to, emulsions of urethane resins, polyester resins, acrylic-based resins, vinyl acetate-based resins, styrene-based resins, butadiene-based resins, styrene-butadiene-based resins, vinyl chloride-based resins, acrylic styrene-based resins, and acrylic silicone-based resins. Of these, in terms of fixability and ink stability, emulsions of urethane resins or acrylic-based resins are preferable. Moreover, a dispersant such as a surfactant can be optionally added to a resin emulsion. In particular, a so-called self-emulsifiable resin emulsion is preferable in terms of applied layer's performance. It is preferable to contain an anionic group in an acid value range of from 5 mgKOH to 100 mgKOH/g in terms of water dispersability. To impart excellent scratch resistance and chemical resistance, it is particularly preferable that the acid value ranges from 5 mgKOH to 50 mgKOH/g.

In addition, it is possible to obtain good hydrodispersibility by using carboxylic group, sulfonic acid group, etc. as anionic group. To introduce such an anionic group into a resin, it is suitable to use a monomer having such an anionic group.

Any suitably synthesized resin emulsion and products available on market are also usable.

Specific examples of the resin emulsions available on market include, but are not limited to, Microgel E-1002 and E-5002 (styrene-acrylic-based resin emulsion, manufactured by Nippon Paint Co., Ltd.), Voncoat 4001 (acrylic-based resin emulsion, manufactured by Dainippon Ink and Chemicals, Inc.), Voncoat 5454 (styrene-acrylic-based resin emulsion, manufactured by Dainippon Ink and Chemicals, Inc.), SAE-1014 (styrene-acrylic-based resin emulsion, manufactured by Nippon Zeon Co., Ltd.), and Saivinol SK-200 (acrylic-based resin emulsion, manufactured by Saiden Chemical Industry Co., Ltd.), Primal AC-22 and AC-61 (acrylic-based resin emulsion, manufactured by The Dow Chemical Company), NANOCRYL SBCX-2821 and 3689 (acrylic-silicone-based resin emulsion, manufactured by Toyo Ink Co., Ltd.), and #3070 (methyl methacrylate polymer resin emulsion, manufactured by MIKUNI COLOR LTD.).

In addition, with regard to the particle diameter of the resin emulsion, considering the usage of these in an inkjet recording device, the volume average particle diameter is preferably from 10 nm to 1,000 nm and more preferably from 20 nm to 50 nm. When a resin emulsion has a volume average particle diameter of from 20 nm to 50 nm, the contact between the surface of the resin dispersed in an ink and the silicone-based surfactant increases so that the disperability of the resin emulsion increases and the smoothness of an ink layer is improved when the layer is formed. As a result, a higher level of gloss is obtained.

The volume average particle diameter can be measured by using a particle size analyzer (Microtrac MODEL UPA 9340, manufactured by Nikkiso Co., Ltd.).

The content of the resin emulsion in an ink is preferably from 1% by weight to 10% by weight in terms of fixability and ink stability and more preferably from 5% by weight to 10% by weight to improve smoothness of an ink layer, obtain a high level of image gloss, and ameliorate fixability to a substrate.

Moreover, when the content of the resin in an ink is increased to the content of a pigment or more, preferably at least the double, it is possible to obtain a higher level of image gloss and abrasion resistance.

In the present disclosure, in particular, a higher level of image gloss is obtained by using a polycarbonate-based urethane resin of the resin emulsions mentioned above, which is more preferable.

The polycarbonate-based urethane resin is obtained by reaction conducted between polycarbonate polyol and polyisocyanate.

It is possible to use as the polycarbonate polyol mentioned above polyols prepared by, for example, ester exchange reaction of a carboxylic acid ester and a polyol under the presence of a catalyst or reaction between phosgene and bisphenol A.

Specific examples of the carboxylic acid ester mentioned above include, but are not limited, to methyl carbonate, dimethyl carbonate, ethyl carbonate, diethyl carbonate, cyclocarbonate, and diphenyl carbonate. Specific examples of the polyol mentioned above to react with the carboxylic acid ester include, but are not limited, low-molecular weight diol compounds such as ethylene glycol, diethylene glycol, 1,2,-propylene glycol, dipropylene glycol, 1,4-butane diol, 1,5-pentane diol, 3-methyl-1,5-pentane diol, 1,6-hexane diol, neopentyl glycol, and 1,4-cyclohexane diol; polyethylene glycol, and polypropylene glycol.

There is no specific limit to the polyisocyanate mentioned above. Specific examples thereof include, but are not limited to, aromatic polyisocyante compounds such as 1,3-phenylene diisocyanate, 1,4-phenylene diisocyanate, 2,4-tolylene diisocyanate (TDI), 2,6-tolylene diisocyanate, 4,4'-diphenylene methane diisocyanate (MDI), 2,4-diphenyl methane diisocyanate, 4,4'-diisocynato biphenyl, 3,3'-dimethyl-4,4'-diisocyanate biphenyl, 3,3'-dimethyl-4,4'-diisocyanate, diphenyl methane, 1,5-naphtylene diisocyanate, m-isocyanate pheny sulphonyl isocyanate, p-isocyanate phenyl sulfonyl isocyanate, and p-isocyanate phenyl sulfonyl isocyante; aliphatic polyisocyanates compounds such as ethylene diisocyanate, tetramethylene diisocyanate, hexamethylene diisocyanate (HDI), dodecamethylene diisocyanate, 1,6,11-undecane triisocyanate, 2,2,4-trimethyl hexamethylene diisocyanate, lysine diisocyanate, 2,6-diisocyante methylcaproate, bis(2-isocyanate ethyl)fumarate, bis(2-isocyanateethyl)carbonate, and 2-isocyanate ethyl-2,6-diisocyanate hexanoate; and alicyclic polycyanate compounds such as isophorone diisocyanate (IPDI), 4,4'dicyclohexyl methane diisocyanate (hydrogenated MDI), cyclohexylene diisocyante, methylcyclohexylene diisocyanate (hydrogenated TDI), bis(2-isocyanateethyl)-4-dichlorohexene-1,2-dicarboxylate, 2,5-norbornane diisocyante, and 2,6-norbonane diisocyante. These can be used alone or in combination.

The ink of the present disclosure can optionally contain other components such as preservatives and fungicides, corrosion inhibitors, and pH regulators in addition to the component specified above.

Specific examples of the preservatives and fungicides include, but are not limited to, 1,2-benzisothiazoline-3-on, sodium benzoate, dehydrosodium acetate, sodium sorbate, pentachlorophenol sodium, and 2-pyridine thiol-1-oxide sodium.

Specific examples of the corrosion inhibitors include, but are not limited to, acid sulfite, thiosodium sulfate, ammonium thiodiglycolate, diisopropyl ammonium nitrite, pentaerythritol tetranitrate, and dicyclohexyl ammonium nitrite.

The pH regulator can be any material that can adjust pH to a desired value without an adverse impact on an ink to be prescribed. Specific examples thereof include, but are not limited to, hydroxides of alkali metal elements such as lithium hydroxide, sodium hydroxide, and potassium hydroxide; carbonates of alkali metals such as lithium carbonate, sodium carbonate, and potassium carbonate; hydroxides of quaternary ammonium, amines such as diethanol amine and triethanol amine; ammonium hydroxide, and hydroxides of quaternary phosphonium.

The ink of the present disclosure is manufactured by dissolving the ink composition mentioned above in an aqueous medium followed by optional mixing and stirring. A stirrer using a typical stirring blade, a magnetic stirrer, a high performance disperser etc., can be used for the mixing and stirring.

Inkjet Recording Method

The inkjet recording method of the present disclosure includes image forming steps of at least applying a stimulus (energy) to the ink to discharge the ink to form an image on a recording medium and other optional steps such as heating and drying steps.

Various known inkjet recording methods can be applied to the image forming step. For example, there are an inkjet recording method employing scanning heads and an inkjet recording method of recording an image on a sheet-like printing paper using lined heads.

In general, recording heads are used as the ink discharging device in the image forming step. There is no specific limit to the system of driving a recording head. Specific examples thereof include, but are not limited to, a piezoelectric actuator using lead zirconate titanate (PZT), etc., a system applying a heat energy, a recording head of on-demand type using an actuator utilizing an electrostatic force, and a recording head of a continuous spraying type charge control system. The inkjet recording method of the present disclosure preferably includes a heating and drying process to heat and dry a recording medium after printing in order to form an image with higher quality, abrasion resistance, and attachability and demonstrate high performance under high speed printing conditions. In addition, it is possible to suitably select and use a known heating device. For example, devices for forced-air heating, radiation heating, conduction heating, or microwave drying can be used. These can be used alone or in combination.

The heating temperature can be changed depending on the kind and amount of a hydrosoluble organic solvent contained in ink and the lowest layer forming temperature of an added resin emulsion. It also can be changed depending on the kind of printed substrate. When the heating temperature ranges from 40° C. to 80° C., preferably from 50° C. to 90° C., the recording medium can be appropriately dried and the temperature of the ink head rises without an adverse impact on members for use in printing, so that non-discharging is avoidable, which is preferable.

Ink Cartridge

Each ink constituting an inkset can be accommodated in an ink container such as ink bag, which can be used as an ink cartridge. Any other suitable member can be used in combination.

There is no specific limit to the container. Any form, any structure, any size, and any material can be suitably selected. For example, a container having an ink bag formed of aluminum laminate film, a resin film, etc. can be suitably used.

Figure 3:
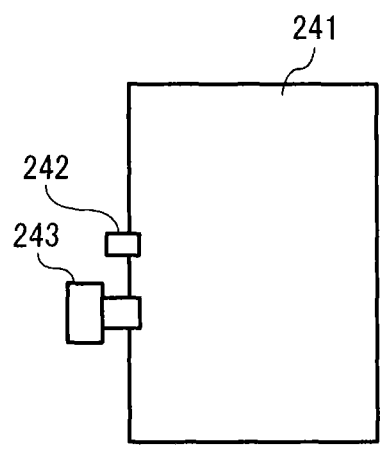
FIG. 3 is a schematic diagram illustrating an example of an ink bag 241 of the ink cartridge according to an embodiment of the present invention.
Figure 4:
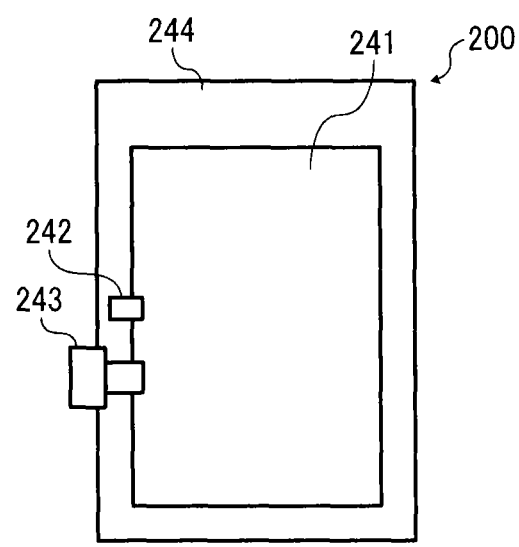
FIG. 4 is a schematic diagram illustrating an example of the ink cartridge 200 that accommodates an ink bag 241 illustrated in FIG. 3 in a cartridge housing 244.

Next, the ink cartridge is described in detail with reference to FIGS. 3 and 4. FIG. 3 is a schematic diagram illustrating an example of an ink bag 241 of the ink cartridge of the present disclosure. FIG. 4 is a schematic diagram illustrating an ink cartridge 200 that accommodates the ink bag of FIG. 3 in a cartridge housing 244.

As illustrated in FIG. 3, after the ink bag 241 is filled with the ink through an ink inlet 242 and the air remaining in the ink bag 241 is discharged, the ink inlet 242 is closed by fusion. When in use, an ink outlet 243 made of rubber is pierced by the needle attached to the inkjet recording device to supply the ink into the device. The ink bag 241 is formed of a packaging material such as aluminum laminate film having no air permeability. The ink bag 241 is accommodated in a cartridge housing 244 made of plastic as illustrated in FIG. 4 and detachably attachable to various inkjet recording devices as the ink cartridge 200.

It is particularly preferable that the ink cartridge of the present disclosure is detachably attachable to the inkjet recording device of the present disclosure.

Inkjet Recording Device and Recording Method

The inkjet recording device of the present disclosure includes an ink discharging device to apply energy to an aqueous ink for inkjet to discharge the ink to record an image, a transfer device to transfer a non-permeating substrate, and a heating device to heat the non-permeating substrate to fix ink droplets on the non-permeating substrate.

The ink discharging device discharges the aqueous ink of the present disclosure to form an image by applying an stimulus to the ink.

There is no specific limit to the ink discharging device. Appropriate devices are select to particular applications. For example, various recording heads (ink discharging heads) can be used. In particular, a unit having a head multiple nozzle lines and a sub-tank accommodating liquid supplied from a liquid reserve tank to supply the liquid to the head is preferable.

It is preferable that the sub-tank mentioned above has a negative pressure producing device to produce a negative pressure in the sub-tank, an air releasing device to release air in the sub-tank, and a detector to detect whether there is ink therein by the difference of electric resistances.

The stimulus is generated by, for example, a stimulus generating device. There is no specific limit to the selection of the stimuli. Heat (temperature), pressure, vibration, and light can be suitably used.

These can be used alone or in combination.

Of these, heat and pressure are preferable.

Examples of the device to generate such a stimulus include a heater, a pressurization device, a piezoelectric element, a vibrator, an ultrasonic oscillator, light, etc.

Specific examples thereof include, but are not limited to, a piezoelectric actuator such as the piezoelectric element, a thermal actuator that utilizes a phase change caused by film boiling of liquid using an electric heat conversion element such as a heat generating resistance, a shape-memory alloy actuator that uses the metal phase change due to temperature change, and an electrostatic actuator that utilizes an electrostatic force.

There is no specific limit to how the ink for recording is discharged, which differs depending on the kind of the stimulus. For example, in the case in which the stimulus is "heat", a method can be utilized in which thermal energy in response to recording signals is imparted by, for example, a thermal head to generate foams in the ink for recording and the ink for recording is discharged and sprayed as droplets through the nozzle holes of the recording head by the pressure of the foam.

In addition, in the case in which the stimulus is "pressure", for example, a method can be utilized in which the ink for recording is discharged and sprayed through the nozzle holes of the recording head as droplets by applying a voltage to a piezoelectric element attached to the position of a pressure room located in the ink flow path in the recording head, thereby bending the piezoelectric element, resulting in a decrease in the volume of the pressure room.

It is preferable to discharge ink by applying a voltage to a piezoelectric element.

No heat is generated in the piezoelectric system, which is advantageous to discharge an ink containing a resin. This is particularly suitable to subdue clogging in nozzles when an ink containing a small amount of wetting agent is used.

In addition, to prevent non-discharging of ink ascribable to clogging of nozzles, it is preferable to conduct false scanning by applying to a piezoelectric element a voltage above which ink is discharged.

Furthermore, it is preferable to operate discharging of an ink to an ink storing portion before false scanning reaching an amount corresponding to one page printing.

In addition, it is preferable to include a scraper to scrape off the ink fixated on a receiver of false discharging. Using a wiper or a cutter is preferable as the scraper.

In addition, the inkjet recording device of the present disclosure optionally includes a transfer device to transfer a recording medium.

As the transfer device, known transfer devices such as a transfer roller and a transfer belt are suitable.

The ink of the present disclosure can be used to print high quality images on the non-permeating substrate. However, it is suitable to heat a recording medium during printing in terms of forming an image with higher quality, abrasion resistance, and attachability and demonstrating high performance in high speed performance printing conditions and preferable to heat and dry the recording medium after printing.

The heater can be one or some of known heaters.

Specific examples thereof include, but are not limited to, devices for forced-air heating, radiation heating, conduction heating, or microwave drying. These can be use alone or in combination.

Such a heating device can be installed in or outside a typical inkjet printer.

The heating temperature can be changed depending on the identity and amount of a water soluble organic solvent contained in an ink and the lowest layer forming temperature of an added resin emulsion. It also can be changed depending on the identity of substrates.

The heating temperature is preferably high in terms of drying property and film-forming temperature. However, if the heating temperature is too high, a substrate on which an image is printed is damaged or even an ink head is heated, thereby causing non-discharging of ink. This is not preferable. In general, it is preferable to heat a recording medium in the range of from 30° C. to 60° C. during recording and, more preferable, from 30° C. to 45° C. It is preferable to control the drying temperature after recording not higher than 110° C.

An embodiment of the inkjet recording device of the present disclosure is described with reference to drawings.

FIG. 1 is a schematic diagram illustrating the inkjet recording device according to an embodiment of the present disclosure. An inkjet recording device 101 illustrated in FIG. 1 has a sheet feeder tray 102 to feed recording media placed in the inkjet recording device 101, an ejection tray 103 attached to the inkjet recording device 101, which stores the recording media (substrates) on which images are recorded (formed), and an ink cartridge installation unit 104. On the upper surface of the ink cartridge installation unit 104 is arranged an operating portion 105 including operation keys, a display, etc. The ink cartridge installation unit 104 has a front cover 115 that is openable and closable to detach and attach an ink cartridge 200. The reference numeral 111 represents an upper cover and, 112, the front surface of the front cover.

Figure 2:
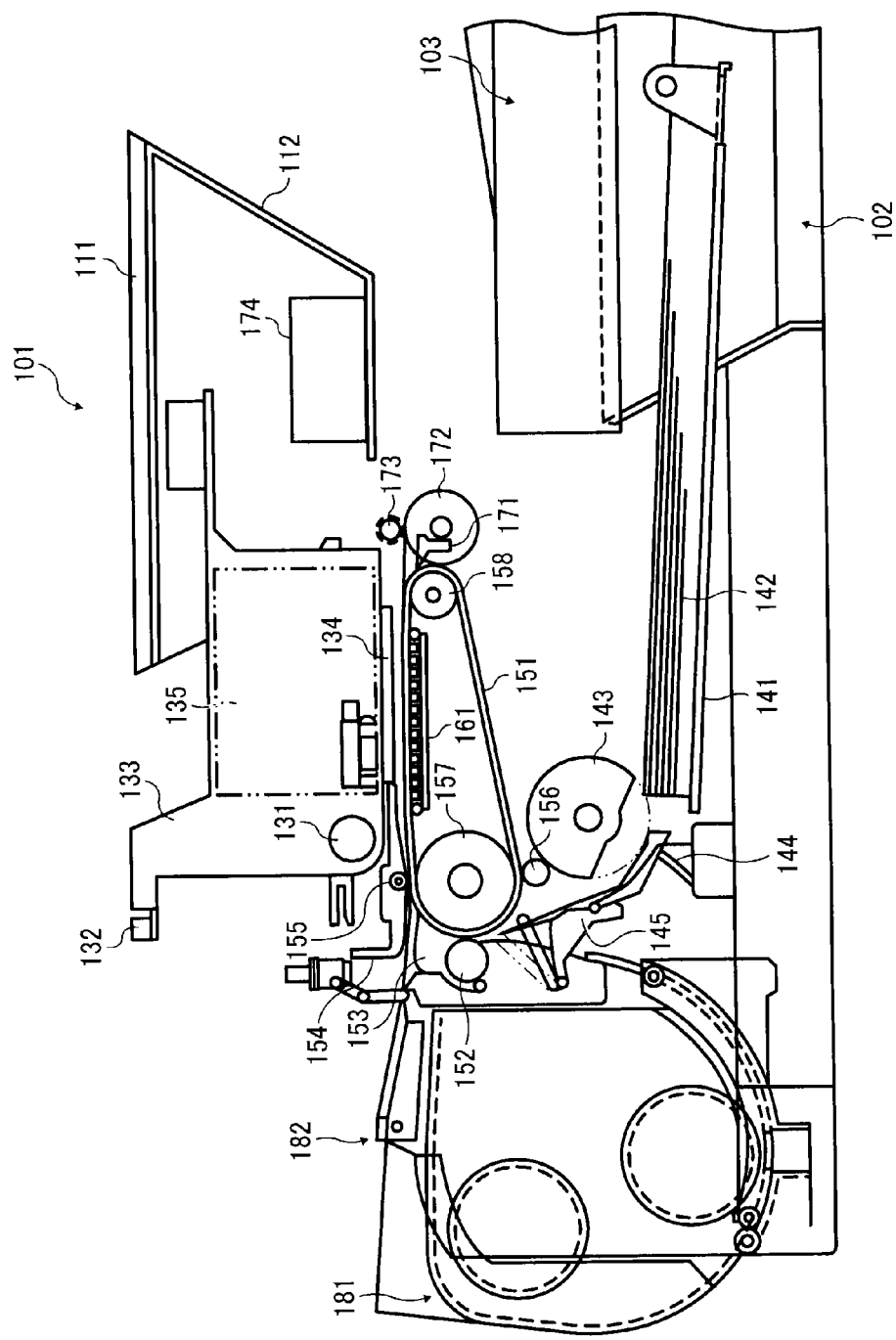
FIG. 2 is a schematic diagram illustrating the configuration of the device illustrated in FIG. 1.

Inside the inkjet recording device 101, as illustrated in FIG. 2, a guide rod 131 serving as a guiding member that laterally bridges side plates provided on the right side and left side and a stay 132 hold a carriage 133 slidably movable in the main scanning direction. A main scanning motor moves the carriage 133 for scanning.

The carriage 133 has a recording head 134 having four inkjet recording heads that discharge ink droplets of each color of yellow (Y), cyan (C), magenta (M), and black (Bk) while multiple ink discharging mouths are arranged in the direction crossing the main scanning direction with the ink droplet discharging direction downward.

As the heads for inkjet recording that form the recording head 134, it is possible to use a device having an energy-generating device to eject (discharge) an ink such as a piezoelectric actuator such as a piezoelectric element, a thermal actuator that utilizes the phase change caused by film boiling of liquid by using an electric heat conversion element such as a heat element, a shape-memory alloy actuator that uses the metal phase change due to the temperature change, and an electrostatic actuator that uses an electrostatic force.

The carriage 133 has sub tanks 135 for respective colors to supply each color ink to the recording head 134. The ink for inkjet recording of the present disclosure is supplied and replenished to the sub tank 135 from the ink cartridge 200 mounted onto the ink cartridge installation unit 104 via a tube for ink supply.

A sheet feeding unit to feed a substrate 142 loaded on a substrate loader (pressure plate) 141 of the sheet feeder tray 102 includes a half-moon-like shape roller (sheet feeding roller 143) to separate and feed the substrate 142 one by one from the substrate loader 141 and a separation pad 144 that is made of a material having a large friction index and biased towards the sheet feeding roller 143.

A transfer unit to transfer the substrate 142 fed from the sheet feeding unit below the recording head 134 includes a transfer belt 151 to electrostatically adsorb and transfer the substrate 142, a counter roller 152 to transfer the substrate 142 fed from the sheet feeding unit via a guide 145 while pinching the substrate 142 with the transfer belt 151, a transfer guide 153 by which the substrate 142 moves on the transfer belt 151 by changing the transfer direction of the sheet 142 being sent substantially vertically upward by substantially 90°, a front end pressure roller 155 biased towards the transfer belt 151 by a pressing member 154, and a charging roller 156 to charge the surface of the transfer belt 151.

The transfer belt 151 has an endless form, stretched between a transfer roller 157 and a tension roller 158 and is rotatable in the belt transfer direction. This transfer belt 151 has, for example, a top layer serving as a non-permeating substrate adsorption surface made of a resin material such as a copolymer (ETFE) of tetrafluoroethylene and ethylene with no resistance treatment having a thickness about 40 µm and a bottom layer (intermediate resistance layer, earth layer) made of the same material as that for the top layer with resistance treatment with carbon. On the rear side of the transfer belt 151, a guiding member 161 is arranged correspondingly to the printing area by the recording head 134. An ejection unit to eject the substrate 142 on which images are recorded by the recording head 134 includes a separation claw 171 to separate the substrate 142 from the transfer belt 151, a sheet-ejection roller 172, and a sheet ejection roller 173. The substrate 142 is dried by heat wind by a fun heater 174 and thereafter output to a sheet ejection tray 103 arranged below the sheet-ejection roller 172.

A duplex printing sheet feeding unit 181 is mounted in a detachable and attachable manner to the rear side of the inkjet recording device 101.

The duplex printing sheet feeding unit 181 takes in and reverses the non-permeating substrate 142 that is returned by the reverse rotation of the transfer belt 151 and feeds it again between the counter roller 152 and the transfer belt 151. A bypass sheet feeding unit 182 is provided on the upper surface of the duplex printing sheet feeding unit 181

In this inkjet recording device, the substrate 142 is separated and fed from the sheet feeding unit one by one substantially vertically upward, guided by the guide 145, and transferred while being pinched between the transfer belt 151 and the counter roller 152.

Furthermore, the front end of the substrate 142 is guided by the transfer guide 153 and pressed against the transfer belt 151 by the front end pressure roller 155 to change the transfer direction substantially 90°.

Since the transfer belt 157 is charged by the charging roller 156 at this point in time, the sheet 142 is electrostatically adsorbed to the transfer belt 151 and transferred.

By driving the recording head 134 in response to the image signal by moving the carriage 133, the ink droplet is discharged to the substrate 142 not in motion to record an image in an amount of one line and thereafter the substrate 142 is transferred in a predetermined amount to be ready for the recording for the next line. On receiving a signal indicating that the recording has completed or the rear end of the substrate 142 has reached the image recording area, the recording operation stops and the substrate 142 is ejected to the sheet-ejection tray 103.

A serial type (shuttle type) in which the carriage scans is used in this description but this is true in a line-type inkjet recording device having a line type head.

The application of the ink of the present disclosure is not only to inkjet recording methods but also to other methods. Specific examples of such methods in the other fields include, but are not limited to, blade coat methods, gravure coat methods, bar coat methods, roll coat methods, knife coat methods, dip coat methods, die coat methods, and spray coat methods.

Recorded Matter

The recorded matter of the present disclosure includes an image formed on a recording medium with the ink of the present disclosure.

There is no specific limit to the recording medium so that images can be formed on plain paper, gloss paper, special paper, cloth, etc. Images formed on a non-permeating substrate by using the ink of the present disclosure particularly have good gloss and image strength.

This non-permeating substrate is formed of plastic materials such as transparent or colored vinyl chloride film, polyethylene terephthalate (PET), acrylic film, polypropylene film, polyimide film, and polystyrene film, without containing paper components such as wood pulp paper, Japanese paper, synthesized pulp paper, and synthesized fiber paper.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

Next, the present invention is described in detail with reference to Examples and Comparative Examples but not limited thereto. "Parts" in Examples represent "parts by weight".

Example 1

After preliminarily mixing the following recipe, a pigment liquid dispersion was obtained by conducting circulation dispersion for seven hours by a disk-type bead mill (KDL type, manufactured by SHINMARU ENTERPRISES CORPORATION; Media: zirconia ball having a diameter of 0.3 mm).

| Recipe of Liquid Dispersion 1 of Pigment | |
| --- | --- |
| Carbon Black pigment: | 15 parts |
| Anionic surfactant (Pionine A-51-B, manufactured by TAKEMOTO OIL & FAT Co., Ltd.): | 2 parts |
| Deionized water | 83 parts |

Preparation of Polycarbonate-Based Urethane Resin Emulsion A 1,500 g of polycarbonate diol (reaction product of 1,6-hexane diol and dimethyl carbonate), 220 g of 2,2-dimethylol propionic acid (DMPA), and 1,347 g of N-methyl pyrolidone (NMP) were charged in a reaction container equipped with a stirrer, a reflux cooling tube, and a thermometer in a nitrogen atmosphere followed by heating to 60° C. to dissolve DMPA.

Thereafter, 1,445 g of 4,4'dicyclohexyl methane diisocyanate and 2.6 g of dibutyl tin laurylate (catalyst) were added thereto and the resultant was heated to 90° C. to complete urethanification reaction in five hours. As a resultant, a urethane prepolymer having an isocyanate group at its end was obtained.

This reaction mixture was cooled down to 80° C. and 149 g of triethyl amine was admixed therewith. 4,340 g of the resultant mixture was extracted and charged in a liquid mixture of 5,400 g of water and 15 g of triethyl amine while being vigorously stirred.

Thereafter, 1,500 g of ice and 626 g of 35% by weight 2-methyl-1,5-pentane diamine aqueous solution were added to conduct chain elongation reaction followed by distillation away of the solvent in such a manner that the solid portion concentration was 30% by weight to obtain polycarbonate-based urethane resin emulsion A.

This emulsion A was applied to a glass slide to form a layer having a thickness of 10 μm and thereafter the layer was dried at 100° C. for 30 minutes to form a resin film. Martens hardness of the film was measured by a micro surface hardness tester (FISCHERSCOPE HM2000, manufactured by Fischer Instruments K.K. Japan). It was 120 N/mm$^2$ when a Vickers indenter was pressed in under a load of 9.8 mN.

The following recipe containing the liquid dispersion 1 of pigment and the polycarbonate-based urethane resin emulsion A was mixed and stirred and thereafter filtered by a polypropylene filter of 0.2 μm to prepare an ink.

| Ink Recipe | |
| --- | --- |
| Liquid dispersion 1 of pigment: | 20 parts |
| Polycarbonate-based Urethane Resin Emulsion A: | 20 parts |
| Silicone-based surfactant (KF-351A, manufactured by Shin-Etsu Chemical Co., Ltd.): | 1 part |
| 2,4,7,9-tetramethyldecane-4,7-diol: | 0.5 parts |
| 1,2-propanediol (boiling point 188° C.): | 20 parts |
| 3-ethyl-3-hydroxymethyl oxetane (boiling point 240° C.): | 15 parts |
| Preservatives and fungicides (PROXEL LV, manufactured by AVECIA GROUP): | 0.1 parts |
| Deionized water | 23.4 parts |

The properties of the inks were measured and evaluated as follows: The inks of Examples 2 to 17 and Comparative Examples 1 to 6 were evaluated in the same manner. The results are shown in Table 2.

Evaluation on Solid Image Area Ratio

An inkjet printer (IPSiO GXe5500, manufactured by Ricoh Company Ltd.) was filled with each manufactured ink and a solid image was printed at 25° C. on three kinds of substrates of a polyvinyl chloride (PVC) film (DGS-210-WH, manufactured by Roland DG Corporation), PP film (P2161, manufactured by TOYOBO CO., LTD.), and polyethylene terephthalate (PET) (E5100, manufactured by TOYOBO CO., LTD.) followed by drying at 80° C. for one hour.

The solid image was observed by a microscope (VHX-200, manufactured by KEYENCE CORPORATION under the magnifying power of 20× to measure the ink attached area excluding the area where no ink was attached in the observation image. The ink attached area was evaluated by the following criteria.

A: Ink attached area greater than 97%
B: Ink attached area greater than 95%
C: Ink attached area greater than 92%
D: Ink attached area not greater than 92%

Evaluation of Degree of Image Gloss

An inkjet printer (IPSiO GXe5500, manufactured by Ricoh Company Ltd.) was filled with each manufactured ink and a solid image was printed at 25° C. on three kinds of substrates of a polyvinyl chloride (PVC) film (DGS-210-WH, manufactured by Roland DG Corporation), PP film (P2161, manufactured by TOYOBO CO., LTD.), and polyethylene terephthalate (PET) (E5100, manufactured by TOYOBO CO., LTD.) followed by drying at 80° C. for one hour. Thereafter, gloss at 60 degree of the solid image portion was measured by a gloss meter (4501, manufactured by BYK Gardener) and evaluated according to the following criteria.

Evaluation Criteria
A: Gloss at 60° 100% or more
B: Gloss at 60° from 80% to less than 100%
C: Gloss at 60° from 60% to less than 80%
D: Gloss at 60° less than 60%

Example 2

A liquid dispersion 2 of pigment was manufactured in the same manner as in the preparation of liquid dispersion 1 of pigment of Example 1 except that the pigment was changed to pigment blue 15:3.

The following recipe shown in Table 1 including the liquid dispersion 2 of pigment was mixed and stirred and thereafter an ink was prepared in the same manner as in Example 1.

The results are shown in Table 2.

Example 3

A liquid dispersion 3 of pigment was manufactured in the same manner as in the preparation of liquid dispersion 1 of pigment of Example 1 except that the pigment was changed to pigment red 122.

The following recipe shown in Table 1 including the liquid dispersion 3 of pigment was mixed and stirred and thereafter an ink was prepared in the same manner as in Example 1. The results are shown in Table 2.

Example 4

A liquid dispersion 4 of pigment was manufactured in the same manner as in the preparation of liquid dispersion 1 of pigment of Example 1 except that the pigment was changed to pigment yellow 74.

The following recipe shown in Table 1 including the liquid dispersion 4 of pigment was mixed and stirred and thereafter an ink was prepared in the same manner as in Example 1. The results are shown in Table 2.

Example 5

The following recipe shown in Table 1 was mixed and stirred and thereafter an ink was prepared in the same manner as in Example 1.

The thus-obtained ink was evaluated in the same manner as in Example 1.

The results are shown in Table 2.

Example 6

The following recipe shown in Table 1 was mixed and stirred and thereafter an ink was prepared in the same manner as in Example 1.

The thus-obtained ink was evaluated in the same manner as in Example 1.

The results are shown in Table 2.

Example 7

The following recipe shown in Table 1 was mixed and stirred and thereafter an ink was prepared in the same manner as in Example 1.

The thus-obtained ink was evaluated in the same manner as in Example 1.

The results are shown in Table 2.

Example 8

The following recipe shown in Table 1 was mixed and stirred and thereafter an ink was prepared in the same manner as in Example 1.

The thus-obtained ink was evaluated in the same manner as in Example 1.

The results are shown in Table 2.

Example 9

The following recipe shown in Table 1 was mixed and stirred and thereafter an ink was prepared in the same manner as in Example 1.

The thus-obtained ink was evaluated in the same manner as in Example 1.

The results are shown in Table 2.

Example 10

The following recipe shown in Table 1 was mixed and stirred and thereafter an ink was prepared in the same manner as in Example 1.

The thus-obtained ink was evaluated in the same manner as in Example 1.

The results are shown in Table 2.

Example 11

The following recipe shown in Table 1 was mixed and stirred and thereafter an ink was prepared in the same manner as in Example 1.

The thus-obtained ink was evaluated in the same manner as in Example 1.

The results are shown in Table 2.

Example 12

The following recipe shown in Table 1 was mixed and stirred and thereafter an ink was prepared in the same manner as in Example 1.

The thus-obtained ink was evaluated in the same manner as in Example 1.

The results are shown in Table 2.

Example 13

The following recipe shown in Table 1 was mixed and stirred and thereafter an ink was prepared in the same manner as in Example 1.

The thus-obtained ink was evaluated in the same manner as in Example 1.

The results are shown in Table 2.

Example 14

The following recipe shown in Table 1 was mixed and stirred and thereafter an ink was prepared in the same manner as in Example 1.

The thus-obtained ink was evaluated in the same manner as in Example 1.

The results are shown in Table 2.

Example 15

The following recipe shown in Table 1 was mixed and stirred and thereafter an ink was prepared in the same manner as in Example 1.

The thus-obtained ink was evaluated in the same manner as in Example 1.

The results are shown in Table 2.

Example 16

The following recipe shown in Table 1 was mixed and stirred and thereafter an ink was prepared in the same manner as in Example 1.

The thus-obtained ink was evaluated in the same manner as in Example 1.

The results are shown in Table 2.

Example 17

The following recipe shown in Table 1 was mixed and stirred and thereafter an ink was prepared in the same manner as in Example 1.

The thus-obtained ink was evaluated in the same manner as in Example 1.

The results are shown in Table 2.

Comparative Example 1

The following recipe shown in Table 1 was mixed and stirred and thereafter an ink was prepared in the same manner as in Example 1.

The thus-obtained ink was evaluated in the same manner as in Example 1.

The results are shown in Table 2.

Comparative Example 2

The following recipe shown in Table 1 was mixed and stirred and thereafter an ink was prepared in the same manner as in Example 1.

The thus-obtained ink was evaluated in the same manner as in Example 1.
The results are shown in Table 2.

Comparative Example 3

The following recipe shown in Table 1 was mixed and stirred and thereafter an ink was prepared in the same manner as in Example 1.
The thus-obtained ink was evaluated in the same manner as in Example 1.
The results are shown in Table 2.

Comparative Example 4

The following recipe shown in Table 1 was mixed and stirred and thereafter an ink was prepared in the same manner as in Example 1.
The thus-obtained ink was evaluated in the same manner as in Example 1.
The results are shown in Table 2.

Comparative Example 5

The following recipe shown in Table 1 was mixed and stirred and thereafter an ink was prepared in the same manner as in Example 1.
The thus-obtained ink was evaluated in the same manner as in Example 1.
The results are shown in Table 2.

Comparative Example 6

The following recipe shown in Table 1 was mixed and stirred and thereafter an ink was prepared in the same manner as in Example 1.
Chemical compound 1 is dimethylamide represented by the following chemical formula 2 and Chemical compound 2 is dimethylamide represented by the following chemical formula 3.
The thus-obtained ink was evaluated in the same manner as in Example 1.
The results are shown in Table 2.

Chemical compound 1

Chemical formula 2

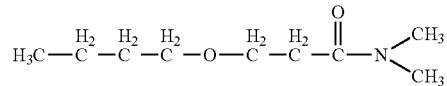

Chemical compound 2

Chemical formula 3

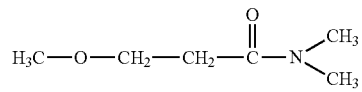

TABLE 1

|  |  | Example 1 | Example 2 | Example 3 | Example 4 |
|---|---|---|---|---|---|
| Pigment | Liquid dispersion 1 of pigment | 20 | | | |
|  | Liquid dispersion 2 of pigment | | 20 | | |
|  | Liquid dispersion 3 of pigment | | | 15 | |
|  | Liquid dispersion 4 of pigment | | | | 15 |
| Resin Emulsion | Polycarbonate-based urethane resin emulsion A: (Solid portion 30%) | 20 | 20 | | |
|  | Acrylic Resin Emulsion (Joncryl ® 537, manufactured by BASF) (solid portion 46%), | | | 13 | 13 |
|  | Polyether-based urethane resin emulsion (SUPERFLEX ® 130, solid portion 35%, manufactured by DAI-ICHI KOGYO SEIYAKU CO., LTD.) | | | | |
|  | Acrylic silicone resin emulsion (Polyzole ROY6312, manufactured by SHOWA HIGHPOLYMER CO., LTD.) (solid portion 39.9%) | | | | |
| Surfactant | Silicone-based surfactant (KF-351A, manufactured by Shin-Etsu Chemical Co., Ltd.): | 1 | 1.2 | 0.09 | |
|  | Silicone-based surfactant (KF-643, manufactured by Shin-Etsu Chemical Co., Ltd.): | | | | |
|  | Silicone-based surfactant (L-7604-, manufactured by Dow Corning Toray Co.) $CH_3(CH_2)_{12}O(CH_2CH_2O)_3CH_2COOH$: | | | | 0.05 |
|  | 2,4,7,9-tetramethyldecane-4,7-diol | 0.5 | | 0.01 | |
|  | 2,5,8,11-tetramethyldodecane-5,8-diol | | 0.4 | | 0.05 |
| Water soluble organic solvent | 1,2-propane diol (boiling point: 188° C.) | 20 | | 15 | |
|  | 2,3-butane diol (boiling point: 183° C.) | | 20 | | 25 |
|  | 1,2-butane diol (boiling point: 194° C.) | | | 10 | |
|  | 2-methyl-2,4-pentanediol (boiling point: 198° C.) | | | | |
|  | Diethyleneglycol methylether (boiling point: 194° C.) | | | | |
|  | 1,3-propanediol (boiling point: 214° C.) | | | | |
|  | 3-ethyl-3-hydroxymethyl oxetane (boiling point: 240° C.) | 15 | | | |
|  | Tripropyleneglycol monomethylether (boiling point: 241° C.) | | 15 | | |

TABLE 1-continued

|  |  |  |  |  |  |
|---|---|---|---|---|---|
|  | 1-ethyl-2-pyrroridone (boiling point: 218° C.) |  |  | 15 |  |
|  | N-methyl-2-pyrroridone (boiling point: 204° C.) |  |  |  | 15 |
|  | Diethylene glycol-n-butyl ether: (boiling point: 230° C.) |  |  |  |  |
|  | Diethylene glycol-n-hexyl ether: (boiling point: 208° C.) |  |  |  |  |
|  | 2-ethyl-1,3-hexanediol (boiling point: 242° C.) |  |  |  |  |
|  | Tripropylene glycol-n-propyl ether (boiling point: 261° C.) |  |  |  |  |
|  | Triethylene glycol (boiling point: 287° C.) |  |  |  |  |
|  | Glycerin (boiling point: 290° C.) |  |  |  |  |
|  | Compound 1 (boiling point: 252° C.) |  |  |  |  |
|  | Compound 2 (boiling point: 216° C.) |  |  |  |  |
| Preservatives and fungicides | PROXEL LV, manufactured by AVECIA GROUP | 0.1 | 0.1 | 0.1 | 0.1 |
| Water | Deionized water | 23.4 | 23.3 | 31.8 | 31.8 |
| Total amount |  | 100 | 100 | 100 | 100 |

|  |  | Example 5 | Example 6 | Example 7 | Example 8 |
|---|---|---|---|---|---|
| Pigment | Liquid dispersion 1 of pigment | 20 |  |  |  |
|  | Liquid dispersion 2 of pigment |  | 20 |  |  |
|  | Liquid dispersion 3 of pigment |  |  | 15 |  |
|  | Liquid dispersion 4 of pigment |  |  |  | 15 |
| Resin Emulsion | Polycarbonate-based urethane resin emulsion A: (Solid portion 30%) |  |  | 15 | 20 |
|  | Acrylic-based resin emulsion (Joncryl ® 537, manufactured by BASF) (solid portion 46%), |  |  | 5 |  |
|  | Polyether-based urethane resin emulsion (SUPERFLEX ® 130, solid portion 35%, manufactured by DAI-ICHI KOGYO SEIYAKU CO., LTD.) | 18 | 18 |  |  |
|  | Acrylic silicone resin emulsion (Polyzole ROY6312, manufactured by SHOWA HIGHPOLYMER CO., LTD.) (solid portion 39.9%) |  |  |  |  |
| Surfactant | Silicone-based surfactant (KF-351A, manufactured by Shin-Etsu Chemical Co., Ltd.): |  | 1.5 | 1 | 1 |
|  | Silicone-based surfactant (KF-643, manufactured by Shin-Etsu Chemical Co., Ltd.): |  |  |  |  |
|  | Silicone-bsed surfactant (L-7604-, manufactured by Dow Corning Toray Co.) $CH_3(CH_2)_{12}O(CH_2CH_2O)_3CH_2COOH$: | 2.7 |  |  |  |
|  | 2,4,7,9-tetramethyldecane-4,7-diol | 0.3 |  | 0.5 | 0.2 |
|  | 2,5,8,11-tetramethyldodecane-5,8-diol |  | 1.5 |  |  |
| Water Soluble Organic Solvent | 1,2-propanediol (boiling point: 214° C.) | 20 |  |  |  |
|  | 2,3-butane diol (boiling point: 194° C.) |  | 20 | 25 |  |
|  | 1,2-butane diol (boiling point: 194° C.) |  |  |  |  |
|  | 2-methyl-2,4-pentanediol (boiling point: 198° C.) |  |  |  | 25 |
|  | Diethyleneglycol methylether (boiling point: 194° C.) |  |  |  |  |
|  | 1,3-propanediol (boiling point: 214° C.) |  | 10 |  |  |
|  | 3-ethyl-3-hydroxymethyl oxetane (boiling point: 240° C.) |  |  |  |  |
|  | Tripropyleneglycol monomethylether (boiling point: 241° C.) |  |  |  |  |
|  | 1-ethyl-2-pyrroridone (boiling point: 218° C.) |  |  |  |  |
|  | N-methyl-2-pyrroridone (boiling point: 204° C.) |  |  |  |  |
|  | Diethylene glycol-n-butyl ether: (boiling point: 230° C.) | 15 |  |  | 15 |
|  | Diethylene glycol-n-hexyl ether: (boiling point: 208° C.) |  | 10 |  |  |
|  | 2-ethyl-1,3-hexanediol (boiling point: 242° C.) |  |  |  |  |
|  | Tripropylene glycol-n-propyl ether (boiling point: 261° C.) |  |  | 15 |  |
|  | Triethylene glycol (boiling point: 287° C.) |  |  |  |  |
|  | Glycerin (boiling point: 290° C.) |  |  |  |  |

TABLE 1-continued

|  |  | | | | |
|---|---|---|---|---|---|
|  | Compound 1 (boiling point: 252° C.) | | | | |
|  | Compound 2 (boiling point: 216° C.) | | | | |
| Preservatives and fungicides | PROXEL LV, manufactured by AVECIA GROUP | 0.1 | 0.1 | 0.1 | 0.1 |
| Water | Deionized water | 23.9 | 18.9 | 23.4 | 23.7 |
| Total amount |  | 100 | 100 | 100 | 100 |

|  |  | Example 9 | Example 10 | Example 11 | Example 12 |
|---|---|---|---|---|---|
| Pigment | Liquid dispersion 1 of pigment | 20 |  | 20 |  |
|  | Liquid dispersion 2 of pigment |  | 15 |  | 15 |
|  | Liquid dispersion 3 of pigment |  |  |  |  |
|  | Liquid dispersion 4 of pigment |  |  |  |  |
| Resin Emulsion | Polycarbonate-based urethane resin emulsion A: (Solid portion 30%) | 20 | 20 |  |  |
|  | Acrylic-based resin emulsion (Joncryl ® 537, manufactured by BASF) (solid portion 46%), |  |  | 13 |  |
|  | Polyether-based urethane resin emulsion (SUPERFLEX ® 130, solid portion 35%, manufactured by DAI-ICHI KOGYO SEIYAKU CO., LTD.) |  |  |  | 18 |
|  | Acrylic silicone resin emulsion (Polyzole ROY6312, manufactured by SHOWA HIGHPOLYMER CO., LTD.) (solid portion 39.9%) |  |  |  |  |
| Surfactant | Silicone-based surfactant (KF-351A, manufactured by Shin-Etsu Chemical Co., Ltd.): | 1 | 0.5 | 1.2 | 1.2 |
|  | Silicone-based surfactant (KF-643, manufactured by Shin-Etsu Chemical Co., Ltd.): |  |  |  |  |
|  | Silicone-based surfactant (L-7604-, manufactured by Dow Corning Toray Co.) |  |  |  |  |
|  | $CH_3(CH_2)_{12}O(CH_2CH_2O)_3CH_2COOH$: |  |  |  |  |
|  | 2,4,7,9-tetramethyldecane-4,7-diol | 0.2 | 1 |  | 0.4 |
|  | 2,5,8,11-tetramethyldodecane-5,8-diol |  |  | 0.1 |  |
| Water soluble organic solvent | 1,2-propanediol (boiling point: 188° C.) | 15 |  | 20 |  |
|  | 2,3-butane diol (boiling point: 183° C.) |  | 20 |  |  |
|  | 1,2-butane diol (boiling point: 194° C.) |  |  |  | 25 |
|  | 2-methyl-2,4-pentanediol (boiling point: 198° C.) |  |  |  |  |
|  | Diethyleneglycol methylether (boiling point: 194° C.) |  |  |  |  |
|  | 1,3-propanediol (boiling point: 214° C.) |  |  |  |  |
|  | 3-ethyl-3-hydroxymethyl oxetane (boiling point: 240° C.) |  |  |  |  |
|  | Tripropyleneglycol monomethylether (boiling point: 241° C.) | 20 | 15 |  |  |
|  | 1-ethyl-2-pyrroridone (boiling point: 218° C.) |  |  |  |  |
|  | N-methyl-2-pyrroridone (boiling point: 204° C.) |  |  |  |  |
|  | Diethylene glycol-n-butyl ether: (boiling point: 230° C.) |  |  | 15 |  |
|  | Diethylene glycol-n-hexyl ether: (boiling point: 208° C.) |  |  |  |  |
|  | 2-ethyl-1,3-hexanediol (boiling point: 242° C.) |  |  |  |  |
|  | Tripropylene glycol-n-propyl ether (boiling point: 261° C.) |  |  |  |  |
|  | Triethylene glycol (boiling point: 287° C.) |  |  |  | 15 |
|  | Glycerin (boiling point: 290° C.) |  |  |  |  |
|  | Compound 1 (boiling point: 252° C.) |  |  |  |  |
|  | Compound 2 (boiling point: 216° C.) |  |  |  |  |
| Preservatives and fungicides | PROXEL LV, manufactured by AVECIA GROUP | 0.1 | 0.1 | 0.1 | 0.1 |
| Water | Deionized water | 23.7 | 28.4 | 30.6 | 25.3 |
| Total amount |  | 100 | 100 | 100 | 100 |

|  |  | Example 13 | Example 14 | Example 15 | Example 16 |
|---|---|---|---|---|---|
| Pigment | Liquid dispersion 1 of pigment |  |  |  |  |
|  | Liquid dispersion 2 of pigment |  |  |  |  |
|  | Liquid dispersion 3 of pigment |  | 15 |  | 15 |
|  | Liquid dispersion 4 of pigment | 20 |  | 20 |  |

TABLE 1-continued

| | | | | | |
|---|---|---|---|---|---|
| Resin Emulsion | Polycarbonate-based urethane resin emulsion A: (Solid portion 30%) | 20 | | | 20 |
| | Acrylic Resin Emulsion (Joncryl ® 537, manufactured by BASF) (solid portion 46%), | | 5 | | |
| | Polyether-based urethane resin emulsion (SUPERFLEX ® 130, solid portion 35%, manufactured by DAI-ICHI KOGYO SEIYAKU CO., LTD.) | | | | |
| | Acrylic silicone resin emulsion (Polyzole ROY6312, manufactured by SHOWA HIGHPOLYMER CO., LTD.) (solid portion 39.9%) | | | | |
| Surfactant | Silicone-based surfactant (KF-351A, manufactured by Shin-Etsu Chemical Co., Ltd.): | 1.2 | 1 | 1 | 1 |
| | Silicone-based surfactant (KF-643, manufactured by Shin-Etsu Chemical Co., Ltd.): | | | | |
| | Silicone-based surfactant (L-7604-, manufactured by Dow Corning Toray Co.) | | | | |
| | $CH_3(CH_2)_{12}O(CH_2CH_2O)_3CH_2COOH$: | | | | |
| | 2,4,7,9-tetramethyldecane-4,7-diol | 0.4 | 0.5 | 0.2 | 0.5 |
| | 2,5,8,11-tetramethyldodecane-5,8-diol | | | | |
| Water soluble organic solvent | 1,2-propanediol (boiling point: 188° C.) | 8 | | | |
| | 2,3-butane diol (boiling point: 183° C.) | | 25 | | 32 |
| | 1,2-butane diol (boiling point: 194° C.) | | | | |
| | 2-methyl-2,4-pentanediol (boiling point: 198° C.) | | | 25 | |
| | Diethyleneglycol methylether (boiling point: 194° C.) | 15 | | | |
| | 1,3-propanediol (boiling point: 214° C.) | | | | |
| | 3-ethyl-3-hydroxymethyl oxetane (boiling point: 240° C.) | 20 | | | |
| | Tripropyleneglycol monomethylether (boiling point: 241° C.) | | | | |
| | 1-ethyl-2-pyrroridone (boiling point: 218° C.) | | | | |
| | N-methyl-2-pyrroridone (boiling point: 204° C.) | | | | |
| | Diethylene glycol-n-butyl ether: (boiling point: 230° C.) | | | 15 | |
| | Diethylene glycol-n-hexyl ether: (boiling point: 208° C.) | | | | |
| | 2-ethyl-1,3-hexanediol (boiling point: 242° C.) | | | | |
| | Tripropylene glycol-n-propyl ether (boiling point: 261° C.) | | 15 | | 8 |
| | Triethylene glycol (boiling point: 287° C.) | | | | |
| | Glycerin (boiling point: 290° C.) | | | | |
| | Compound 1 (boiling point: 252° C.) | | | | |
| | Compound 2 (boiling point: 216° C.) | | | | |
| Preservatives and fungicides | PROXEL LV, manufactured by AVECIA GROUP | 0.1 | 0.1 | 0.1 | 0.1 |
| Water | Deionized water | 15.3 | 38.4 | 38.7 | 23.4 |
| Total amount | | 100 | 100 | 100 | 100 |

| | | Example 17 | Comparative Example 1 | Comparative Example 2 | Comparative Example 3 |
|---|---|---|---|---|---|
| Pigment | Liquid dispersion 1 of pigment | | 20 | | |
| | Liquid dispersion 2 of pigment | | | 20 | |
| | Liquid dispersion 3 of pigment | 15 | | | 15 |
| | Liquid dispersion 4 of pigment | | | | |
| Resin Emulsion | Polycarbonate-based urethane resin emulsion A: (Solid portion 30%) | 20 | 20 | | |
| | Acrylic Resin Emulsion (Joncryl ® 537, manufactured by BASF) (solid portion 46%), | | | | 13 |
| | Polyether-based urethane resin emulsion (SUPERFLEX ® 130, solid portion 35%, manufactured by DAI-ICHI KOGYO SEIYAKU CO., LTD.) | | | 18 | |
| | Acrylic silicone resin emulsion (Polyzole ROY6312, manufactured by SHOWA HIGHPOLYMER CO., LTD.) (solid portion 39.9%) | | | | |
| Surfactant | Silicone-based surfactant (KF-351A, manufactured by Shin-Etsu Chemical Co., Ltd.): | 1 | 1 | | |

TABLE 1-continued

|  |  |  |  |  |  |
|---|---|---|---|---|---|
| | Silicone-based surfactant (KF-643, manufactured by Shin-Etsu Chemical Co., Ltd.): | | | | |
| | Silicone-based surfactant (L-7604-, manufactured by Dow Corning Toray Co.) | | | | |
| | $CH_3(CH_2)_{12}O(CH_2CH_2O)_3CH_2COOH$: | | | | 1 |
| | 2,4,7,9-tetramethyldecane-4,7-diol | 0.5 | | | 0.5 |
| | 2,5,8,11-tetramethyldodecane-5,8-diol | | | 1.5 | |
| Water soluble organic solvent | 1,2-propanediol (boiling point: 188° C.) | | 20 | | 15 |
| | 2,3-butane diol (boiling point: 183° C.) | 38 | | 20 | |
| | 1,2-butane diol (boiling point: 194° C.) | | | | 10 |
| | 2-methyl-2,4-pentanediol (boiling point: 198° C.) | | | | |
| | Diethyleneglycol methylether (boiling point: 194° C.) | | | | |
| | 1,3-propanediol (boiling point: 214° C.) | | | 10 | |
| | 3-ethyl-3-hydroxymethyl oxetane (boiling point: 240° C.) | | 15 | | |
| | Tripropyleneglycol monomethylether (boiling point: 241° C.) | | | | |
| | 1-ethyl-2-pyrroridone (boiling point: 218° C.) | | | | 15 |
| | N-methyl-2-pyrroridone (boiling point: 204° C.) | | | | |
| | Diethylene glycol-n-butyl ether: (boiling point: 230° C.) | | | | |
| | Diethylene glycol-n-hexyl ether: (boiling point: 208° C.) | | | 10 | |
| | 2-ethyl-1,3-hexanediol (boiling point: 242° C.) | | | | |
| | Tripropylene glycol-n-propyl ether (boiling point: 261° C.) | 2 | | | |
| | Triethylene glycol (boiling point: 287° C.) | | | | |
| | Glycerin (boiling point: 290° C.) | | | | |
| | Compound 1 (boiling point: 252° C.) | | | | |
| | Compound 2 (boiling point: 216° C.) | | | | |
| Preservatives and fungicides | PROXEL LV, manufactured by AVECIA GROUP | 0.1 | 0.1 | 0.1 | 0.1 |
| Water | Deionized water | 23.4 | 23.9 | 20.4 | 30.4 |
| Total amount | | 100 | 100 | 100 | 100 |

| | | Comparative Example 4 | Comparative Example 5 | Comparative Example 6 |
|---|---|---|---|---|
| Pigment | Liquid dispersion 1 of pigment | | | 37.5 |
| | Liquid dispersion 2 of pigment | | | |
| | Liquid dispersion 3 of pigment | | 15 | |
| | Liquid dispersion 4 of pigment | 15 | | |
| Resin Emulsion | Polycarbonate-based urethane resin emulsion A: (Solid portion 30%) | | 20 | |
| | Acrylic Resin Emulsion (Joncryl® 537, manufactured by BASF) (solid portion 46%), | 13 | | |
| | Polyether-based urethane resin emulsion (SUPERFLEX® 130, solid portion 35%, manufactured by DAI-ICHI KOGYO SEIYAKU CO., LTD.) | | | |
| | Acrylic silicone resin emulsion (Polyzole ROY6312, manufactured by SHOWA HIGHPOLYMER CO., LTD.) (solid portion 39.9%) | | | 5 |
| Surfactant | Silicone-based surfactant (KF-351A, manufactured by Shin-Etsu Chemical Co., Ltd.): | | 1 | |
| | Silicone-based surfactant (KF-643, manufactured by Shin-Etsu Chemical Co., Ltd.): | | | 1 |
| | Silicone-based surfactant (L-7604-, manufactured by Dow Corning Toray Co.) | | | |
| | $CH_3(CH_2)_{12}O(CH_2CH_2O)_3CH_2COOH$: | | | 0.4 |
| | 2,4,7,9-tetramethyldecane-4,7-diol | | | |
| | 2,5,8,11-tetramethyldodecane-5,8-diol | | 0.5 | |
| Water soluble organic solvent | 1,2-propanediol (boiling point: 188° C.) | | 20 | |
| | 2,3-butane diol (boiling point: 183° C.) | 25 | | |
| | 1,2-butane diol (boiling point: 194° C.) | | | |
| | 2-methyl-2,4-pentanediol (boiling point: 198° C.) | | | |

TABLE 1-continued

|  |  |  |  |  |
|---|---|---|---|---|
|  | Diethyleneglycol methylether (boiling point: 194° C.) |  |  |  |
|  | 1,3-propanediol (boiling point: 214° C.) |  |  |  |
|  | 3-ethyl-3-hydroxymethyl oxetane (boiling point: 240° C.) |  |  | 10 |
|  | Tripropyleneglycol monomethylether (boiling point: 241° C.) |  |  |  |
|  | 1-ethyl-2-pyrroridone (boiling point: 218° C.) |  |  |  |
|  | N-methyl-2-pyrroridone (boiling point: 204° C.) | 15 |  |  |
|  | Diethylene glycol-n-butyl ether: (boiling point: 230° C.) |  |  |  |
|  | Diethylene glycol-n-hexyl ether: (boiling point: 208° C.) |  |  |  |
|  | 2-ethyl-1,3-hexanediol (boiling point: 242° C.) |  |  | 2 |
|  | Tripropylene glycol-n-propyl ether (boiling point: 261° C.) |  |  |  |
|  | Triethylene glycol (boiling point: 287° C.) |  | 25 |  |
|  | Glycerin (boiling point: 290° C.) |  |  | 10 |
|  | Compound 1 (boiling point: 252° C.) |  |  | 10 |
|  | Compound 2 (boiling point: 216° C.) |  |  | 10 |
| Preservatives and fungicides | PROXEL LV, manufactured by AVECIA GROUP | 0.1 | 0.1 | 0.05 |
| Water | Deionized water | 31.9 | 18.4 | 14.05 |
| Total amount |  | 100 | 100 | 100 |

TABLE 2

|  | Solid image area ratio | | | Image gloss level | | |
|---|---|---|---|---|---|---|
|  | PVC film | PP film | PET film | PVC film | PP film | PET film |
| Example 1 | A | A | A | A | A | A |
| Example 2 | A | A | A | A | A | A |
| Example 3 | A | A | A | A | A | A |
| Example 4 | A | A | A | A | A | A |
| Example 5 | A | A | A | A | A | A |
| Example 6 | A | A | A | A | B | A |
| Example 7 | B | C | B | B | C | B |
| Example 8 | A | B | A | A | B | A |
| Example 9 | A | B | A | A | B | B |
| Example 10 | A | B | B | A | B | B |
| Example 11 | A | B | B | B | B | B |
| Example 12 | B | B | C | B | C | C |
| Example 13 | A | B | B | B | B | B |
| Example 14 | B | C | C | B | C | B |
| Example 15 | A | A | B | A | B | B |
| Example 16 | B | B | B | B | C | B |
| Example 17 | A | B | B | B | C | B |
| Comparative Example 1 | C | D | C | C | D | D |
| Comparative Example 2 | C | C | D | C | D | D |
| Comparative Example 3 | C | D | C | C | D | D |
| Comparative Example 4 | D | D | D | D | D | D |
| Comparative Example 5 | B | C | C | B | C | C |
| Comparative Example 6 | C | C | C | C | C | C |

Examples 1 to 6 are particularly preferable and achieve extremely high solid image area ratios and extremely high level of image gloss regardless of the difference of colors.

In Examples 7 to 9 and 12 to 14, the water soluble organic solvent having a boiling point of 200° C. or lower accounts for less than 50%, the water soluble organic solvent having a boiling point of 200° C. or lower contains no 1,2-propanediol or 2,3-butanediol, or a water soluble organic solvent having a boiling points higher than 250° C. is contained.

In comparison with Examples 1 to 6, either of the solid image area ratio or the image gloss level is slightly inferior but does not cause any practical problem.

In Examples 10 and 11, the ratio of the silicone-based surfactant to the compound represented by Chemical formula 1 ranges outside 1:1 to 9:1. In comparison with Examples 1 to 6, wet spreading is inferior and the solid image area ratio and the image gloss level are slightly inferior.

In Comparison Examples 1 to 4, either or both of the silicone-based surfactant and the compound represented by Chemical formula 1 is not contained. The solid image area ratio and the image gloss level are intolerable in terms of practical use.

As seen in the results, the ink of the present invention is capable of producing images with high image density and gloss without a gap (void) on a non-permeating substrate by ink droplets wet-spreading there even at room temperature.

Having now fully described embodiments of the present invention, it will be apparent to one of ordinary skill in the art that many changes and modifications can be made thereto without departing from the spirit and scope of embodiments of the invention as set forth herein.

What is claimed is:

1. An ink comprising:
   a colorant;
   at least one water soluble organic solvent having a boiling point of 250° C. or higher wherein the total amount of water soluble organic solvent having a boiling point of 250° C. or higher is 38% by weight or less relative to the total amount of water soluble organic solvents;
   at least one water soluble organic solvent having a boiling point of 200° C. or lower wherein the total amount of water soluble organic solvent having a boiling point of 200° C. or lower is 50% by weight or more relative to the total amount of water soluble organic solvents;
   a silicone-based surfactant;
   a compound represented by the following chemical formula 1; and
   water, Chemical formula 1

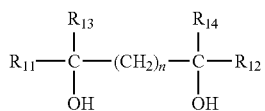

where $R_{11}$ and $R_{12}$ each, independently represent aliphatic hydrocarbon groups having 3 to 6 carbon atoms with forks and $R_{13}$ and $R_{14}$ each, independently represent alkyl groups having one to two carbon atoms, and n represents an integer of from 1 to 6.

2. The ink according to claim 1, wherein the compound represented by Chemical formula 1 is either of one of 2,4,7,9-tetramethyldecane-4,7-diol or 2,5,8,11-tetramethyl dodecane-5,8-diol.

3. The ink according to claim 1, wherein a ratio of the silicone-based surfactant to the compound represented by Chemical formula 1 ranges from 1:1 to 9:1.

4. The ink according to claim 1, wherein the water soluble organic solvent having a boiling point of 200° C. or lower comprises at least one of 1,2-propane diol or 2,3-butane diol.

5. The ink according to claim 1, further comprising at least one water soluble organic solvent having a boiling point ranging from 202° C. to 249° C.

6. The ink according to claim 1, wherein the organic solvent having a boiling point of 250° C. or higher is present in an amount of 5% by weight or less relative to the total amount of water soluble organic solvent.

7. An ink cartridge comprising:
a container to accommodate the ink of claim 1.

8. An inkjet recording method comprising:
discharging the ink of claim 1 by applying energy to said ink for recording.

9. A recorded matter comprising:
a recording medium; and
an image formed on the recording medium utilizing the inkjet recording method of claim 8.

10. An inkjet recording device comprising:
either of one of an ink container and an ink cartridge to contain the ink of claim 1; and
either of one of an inkjet recording head and a recording unit comprising the inkjet recording head to discharge droplets of the ink of claim 1 formed by application of energy to the ink of claim 1.

11. The ink according to claim 1, wherein the colorant is a dye.

12. The ink according to claim 1, wherein the colorant is a pigment.

13. The ink according to claim 12, wherein the pigment has a particle diameter of from 20 nm to 150 nm.

14. The ink according to claim 12, wherein the pigment is an inorganic pigment selected from the group consisting of titanium oxide, iron oxide, calcium oxide, barium sulfate, aluminum hydroxide, barium yellow, cadmium red, chrome yellow, and carbon black.

15. The ink according to claim 12, wherein the pigment is an organic pigment selected from the group consisting of a azo pigment, a polycyclic pigment, a dye chelate, a nitro pigment, a nitroso pigment, and aniline black.

16. The ink according to claim 12, wherein the pigment is a polycyclic pigment selected from the group consisting of a phthalocyanine pigment, a perylene pigment, a perinone pigment, an anthraquinone pigment, a quinacridone pigment, a dioxazine pigment, an indigo pigment, a thioindigo pigment, a isoindolinone pigment, and a quinofuranone pigment.

17. The ink according to claim 5, wherein the at least one water soluble organic solvent having a boiling point ranging from 202° C. to 249° C. is selected from the group consisting of diethylene glycol, dipropylene glycol, 1,3-butanediol, 1,4-butanediol, 2,2-dimethyl-1,3-propane diol, 2-methyl-1,3-propane diol, 1,2-pentanediol, 2,4-pentanediol, 1,5-pentanediol, 2-ethyl-1,3-hexane 1,2-hexanediol, 2,5-hexanediol, dipropylene glycol n-propylether, propyleneglycol phenylether, triethyleneglycol methylether, and ethyleneglycol phenylether, 2-pyrroridone, 1-methyl-2-pyrroridone, 1-ethyl-2-pyrroridone, and 1-acetyl-2-pyrroridone.

* * * * *